Figure 1:
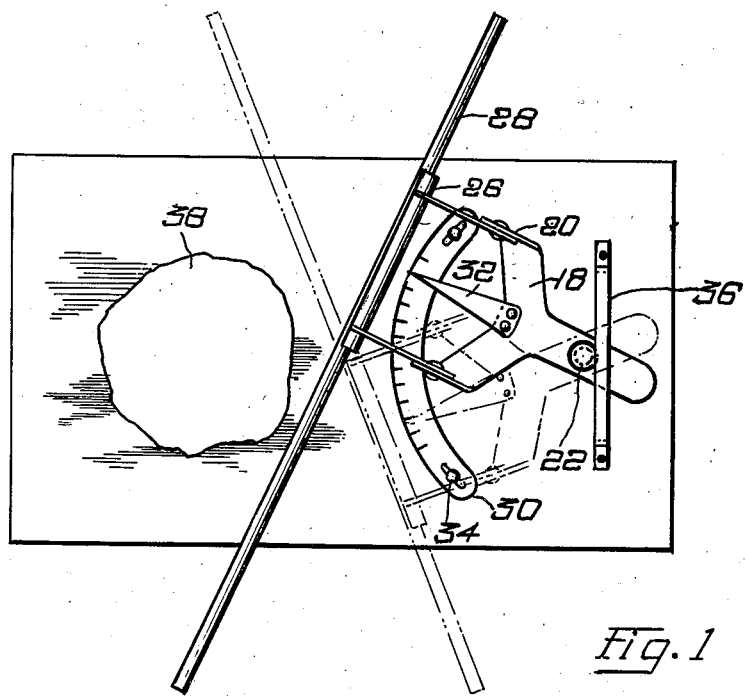

May 3, 1938.  G. M. GRAHAM  2,115,766
WHEEL TURNING GAUGE
Filed Jan. 15, 1936   2 Sheets-Sheet 1

INVENTOR.
George M. Graham
BY
Parker & Burton
ATTORNEY.

May 3, 1938.  G. M. GRAHAM  2,115,766
WHEEL TURNING GAUGE
Filed Jan. 15, 1936  2 Sheets-Sheet 2
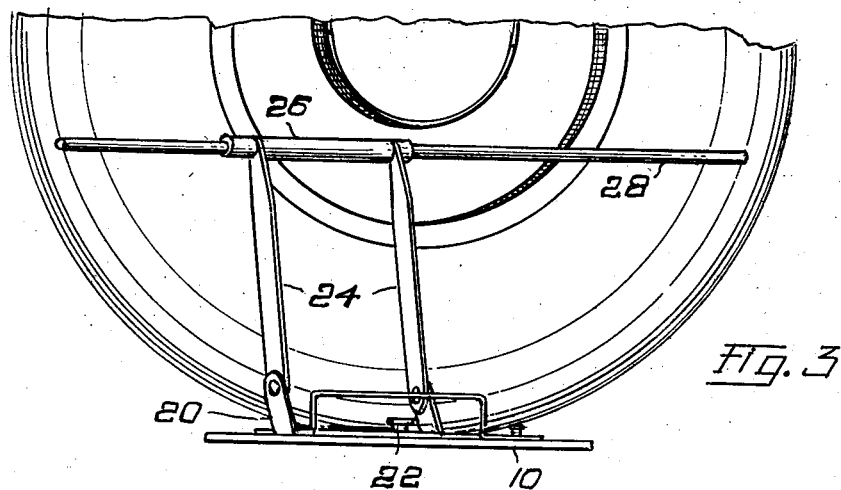
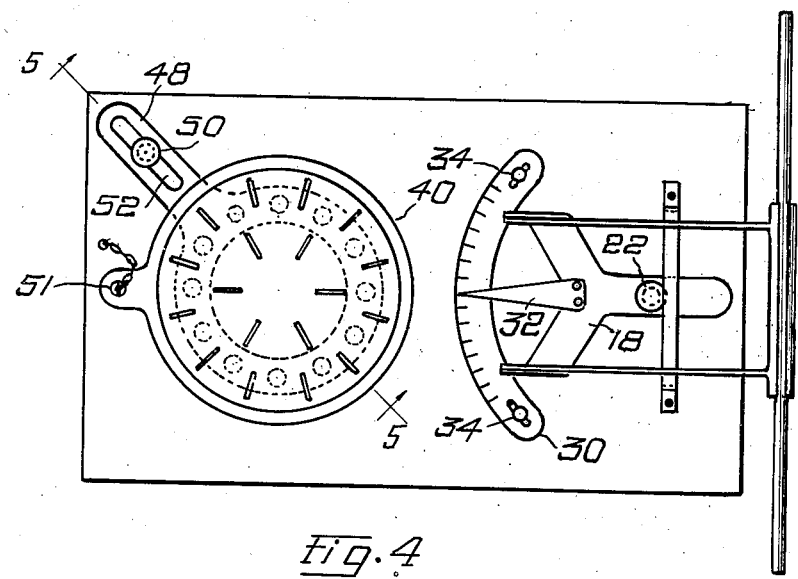
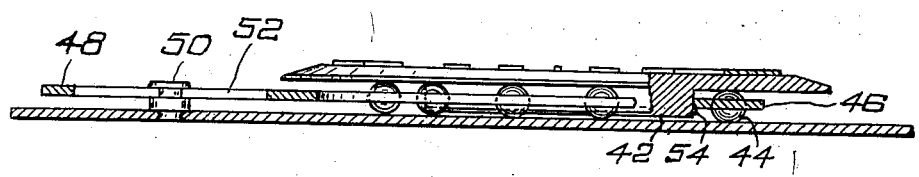
INVENTOR.
George M. Graham
BY
Parker & Burton
ATTORNEY.

Patented May 3, 1938

2,115,766

UNITED STATES PATENT OFFICE 2,115,766

WHEEL TURNING GAUGE

George M. Graham, Detroit, Mich., assignor to Hinckley-Myers Company, Jackson, Mich., a corporation of Michigan Application January 15, 1936, Serial No. 59,169

5 Claims. (Cl. 33—203)

This invention relates to a vehicle wheel gauge and more particularly to such a device for measuring the turning angles of the front steering wheels of vehicles especially when wheel alignment tests are conducted.

When alignment tests are made on the front steering wheels of vehicles it is necessary for certain of the measurements to turn the wheels through prescribed angles about their pivotal connection to the body of the vehicle. The present invention relates to a device for measuring the amount of wheel turn and thereby assisting in the measurement of such wheel aligning factors as the caster and king pin inclinations of the wheel turning axis.

An important object of this invention is to provide a novel and efficient wheel turning gauge consisting of few parts and being of strong construction for resisting damage. A meritorious feature of the invention resides in the provision of scales which are clearly visible to the operator conducting the test so that no inconvenience is encountered in making the measurements.

Another meritorious feature of the invention resides in an embodiment thereof which is adapted to measure the turning angles of vehicle wheels without supporting any of the load of the vehicle upon movable parts. As a result, there is less likelihood of damage to the parts caused by the load of the vehicle. Furthermore, less expense need be incurred in constructing such a structure because there are no parts to be subjected to unusual strains and forces which are likely to occur if the weight of a vehicle is supported upon a movable part.

More specifically, the invention relates to a wheel turning gauge having a part adapted to engage the side of a wheel and determine from that point the direction and amount of turn of the wheel. The invention comprises an apparatus having a stationary part thereof, such as a base plate, for supporting the wheel during its turning movements. Provision is made for permitting the point of wheel contact on the base to slip laterally while the wheel is turned. This provision may consist in one embodiment of the invention of simply a spot of oily matter, such as grease, which reduces the frictional engagement of the wheel upon the base plate and allows the same to shift laterally. Failure to compensate for the lateral thrust of the wheel when it is turned is very likely to affect the accuracy of the wheel alignment measurements. Another embodiment of the invention utilizes a floatable turntable which is adapted to support the wheel for both turning and lateral movement.

The invention illustrated herein includes a flat base plate having one part free to receive and support a vehicle wheel and another part pivotally supporting an upright structure which is adapted to engage the side of a vehicle wheel and determine the amount of wheel turn from this point. The upright structure itself comprises two parts, one of which is pivotally secured to the base plate about a vertical axis and another part which is pivotally secured to the first part about a horizontal axis for swinging movement toward and away from the side of the wheel which is tested. This last part includes a horizontally extending, longitudinally slidable arm which is adapted to engage the side of the wheel at spaced points and determine in this manner the angle in which the plane of the wheel is directed. Means is provided in the form of a scale and pointer for indicating the amount of turn of the wheel engaging structure relative to the surface of the base plate.

Figure 2:
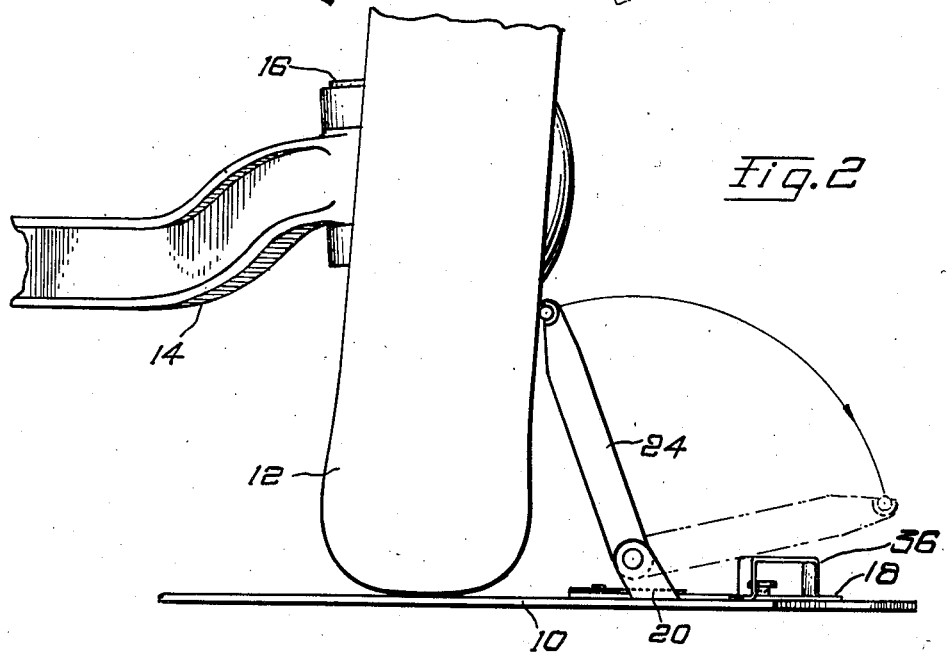

Other objects, advantages, and meritorious features will become more apparent from the following specification, claims, and the accompanying drawings, wherein:

Figure 1 is a top view showing the disposition of the parts on the wheel turning gauge, Fig. 2 is a front end view of a vehicle wheel showing the manner of taking the wheel turning angle from the side of the wheel, Fig. 3 is an end view of the base plate upon which the wheel is mounted but a perspective view of the wheel engaging structure showing the manner in which it pivots to conform to the turning angle of the wheel, Fig. 4 is a top view of a modification of the invention showing the position assumed by a floatable turn-table on the base plate, and Fig. 5 is a view partly in cross-section and partly in elevation taking generally along line 5—5 in Fig. 4.

Usually a pair of the wheel turning gauges described herein, one for each front wheel, are used during the wheel alignment tests. These devices are arranged to engage the outer sides of the front steering wheels where no obstructions are met and where the operation may be clearly discerned. In the drawings only one such device is shown, but it is understood that a similar device may be employed alongside of the other front wheel.

Referring in detail to Figs. 1, 2, and 3, the device comprises a rectangular base plate 10 having a space provided adjacent one end for receiving and supporting a front steering wheel 12 of a vehicle as shown in Fig. 2. The wheel is swivelled to an axle 14 about an axis 16 which is generally inclined both laterally and longitudinally of the vehicle. This is the usual construction. Wheel alignment tests include determination of whether the wheel is swivelled about a properly inclined axis. When wheel alignment tests are made the wheel is turned from one side to the other through certain prescribed angles and the purpose of the apparatus disclosed herein is to determine whether the wheel has been turned the required distance.

When the front steering wheels of a vehicle, such as an automobile, are turned about their swivelling axes, the points of contact of the wheels with the ground or floor partake of a lateral movement over the surface upon which the wheel rests. This results from the inclination of the turning axis. Some provision is generally made for allowing the wheel to partake of this motion with freedom otherwise the amount of turn will be affected and the test rendered inaccurate. In the present invention, two such provisions are shown. One is a relatively simple expedient of placing a slippery oily matter on the surface of the base, such as grease, which will considerably reduce the frictional contact of the wheel with the base plate. The other provision consists in providing a freely floatable turn-table which can both turn and shift horizontally at the same time.

The base plate 10 pivotally supports a structure adjacent one end which is adapted to engage the side of a wheel and to measure the direction in which the plane of the wheel extends. This structure comprises an element or member 18 having a generally Y-shaped configuration. This member is composed of thin stamping metal. The two ends of the Y formation are turned up as at 20 providing supports to which the wheel engaging part of the apparatus may be pivotally supported as will be described more fully hereinafter. A stud or pin 22 pivotally connects member 18 to the base plate.

The two upturned ends or supports 20 are each pivotally connected to one of a pair of parallel arms 24. These arms are connected together at their remote ends by a channeled member 26. The structure including the arms 24 and the member 26 may be of one piece as illustrated. Considered as a whole, this structure has a general U-shaped formation with the member 26 forming the closed end of the U.

The member 26 is channeled, as previously described, and is adapted to slidably and removably receive an element or rod 28 which extends as illustrated for a considerable distance beyond the ends of member 26. This rod is adapted to engage the side of the wheel at spaced points as illustrated in Fig. 3 and determine in this manner the angle of wheel turn. The rod 28 may be swung toward and from the side of the wheel about the pivotal connection of the arms 24 to the member 18. The rod is held under sufficient pressure by the member 26 to prevent it from falling out when it is swung through the extent of its pivotal movement. Considering the apparatus as a whole, it comprises a structure adapted to move into engagement with the side of the wheel at spaced points and to pivot about an axis an amount corresponding to the turning angle of the wheel.

Means for measuring in degrees the turning angle of the wheel comprises a scale 30 adjustably secured to the base plate and a pointer or finger 32 carried by member 18 and arranged to sweep over the scale. The scale is adjustably secured to the base plate by a pair of studs 34 each of which extend through a slot in the scale. The slots in the scale are arranged in such a manner that the scale can be adjusted about pin 22 as a pivotal center. The purpose of this feature is to adjust the scale to a new zero position in case the front wheel is not driven upon the base plate correctly. This will save the step of backing the wheel off the plate and trying to drive on again correctly.

The pivotal connection between the arms 24 and their supports 20 are sufficiently tight to hold the wheel engaging part of the apparatus including the rod 28 in any position of its swinging movement. When in non-use the U-shaped swinging part may be swung to a position substantially parallel with the base plate. In this position very little room is taken up by the apparatus. A handle 36 may be provided for facilitating the operator in moving the apparatus about.

In order to permit the wheel to slip or shift laterally as it turns about the swivelling axis 16, a spot of oily material, such as grease or other suitable material, may be deposited on the base plate at that point where the wheel is positioned. Such a spot is indicated at 38. This reduces the frictional engagement of the wheel with the surface of the base plate and thereby allows the wheel to slip horizontally as it is swung about the turning axis.

Instead of providing a grease spot of the character described above, a floatable turn-table may be employed. Referring to Figs. 4 and 5, a floatable turn-table has been substituted for the grease spot. It is similar in construction to that disclosed in the Graham et al. copending application, Ser. No. 23,366, filed May 25, 1935. It comprises a platform or disc 40 upon which a wheel may be supported. The disc has a central, downwardly extending part 42 about which is positioned a roller bearing race including the roller bearings 44 and an annular cage 46 in which the bearings are held. The bearings form the support between the disc and the top surface of the base plate.

The annular bearing cage 46 has an arm or tongue 48 extending from one side thereof. This arm is slidably and pivotally joined to the base plate by a stud 50 which, as shown, extends through a slot 52 in the arm. The slotted connection of the arm to the stud permits the disc and the ball cage to move in any direction over the surface of the base plate, the only limitation being the extent of the slot. The disc is permitted rotative movement relative to the cage in order that it may turn with the wheel supported thereby. A split ring 54 may be employed for coupling the disc to the ball cage 46 against removal. Since the ball cage is secured against removal from the base plate by the stud 50, the disc is likewise held to the base plate by this means. This provides a unitary structure. The wheel supporting platform 40 may be held stationary during the driving of a car thereonto by the employment of a pin 51 which locks the same to the base 10 in any convenient manner.

When the front wheels of the vehicle are driven upon the base plates of a pair of devices such as shown in Figs. 1 to 3, the rods 28 may be used as guides for directing the driver of the vehicle upon the base plates correctly. The rods may be folded back into position parallel with the intended position of the wheels on the base plates, in the manner shown in Fig. 4. With the rods acting as parallel guides, the driver encounters little difficulty in driving the vehicle upon the plates so that the front wheels extend across the base plates with the zero of the scales 30 normal to the plane of the wheels. In the event that the front wheels are not positioned on the base plates directly normal to the zero mark on the scales, the scales may be adjusted, as previously pointed out, to compensate for the slightly incorrect position of the wheels on the base plates.

To test whether the wheels are on the base plates in proper position opposite to the scales, the wheels are set in their straight ahead position and the operator simply brings the rods 28 up against the sides of the wheels. If the zero points on the scales and the pointers 32 do not coincide, the former may be adjusted until they do. When the wheel is turned through its prescribed angles during the wheel alignment tests, the rods 28 may be folded back while tentative turns of the wheels are made by the operator. The rods 28 may then be brought up against the side of the wheels and adjusted until they contact the wheels at spaced points. If the wheels have not been turned to the desired angle on this first maneuver, they may be further turned with the rods contacting them until the pointers 32 indicate the correct angle.

Instead of pivotally joining the wheel engaging parts of the apparatus to the member 18, this part may be rigidly connected thereto through the arms 24 and substantially the same movement to and from the side of the wheel can be furnished by providing a longitudinal slot through which the stud 22 is arranged to extend. This will allow the whole wheel measuring apparatus including the members 18 and 26 to shift toward and away from the side of the wheel and to pivot relative to the base plate around the stud 22. The U-shaped wheel engaging part may then be either rigidly connected to the member 18 or form an integral part thereof.

What I claim is:

1. A device for measuring the turning angles of vehicle dirigible wheels comprising, in combination, a base plate, a member pivotally secured to said base plate for movement about a vertical axis, a scale carried on the top surface of said base plate, means for adjusting said scale in an arcuate path about the vertical axis of said member as a center, reference indicating means carried by said member for indicating on the scale the amount of turning movement of the member, a U-shaped structure having the arms thereof pivotally secured to said member about a horizontal axis and arranged for swinging movement toward and away from the wheel being tested, the closed end of said U-shaped structure being shaped to receive a rod and permit longitudinal slidable movement of said rod.

2. A device for measuring the turning angles of vehicle dirigible wheels comprising, in combination, a base plate, a member pivotally secured to said base plate for movement about a vertical axis, means for indicating the amount of turning movement of said member relative to said base plate, a U-shaped structure having the arms thereof joined to said member for rotation therewith about said vertical axis, the closed end of said U-shaped structure being channel-shaped to receive a rod, and a rod of a length to contact diametrically opposite points of a vehicle road wheel slidably supported in said channel-shaped end of said U-shaped structure.

3. A device for measuring the turning angles of vehicle dirigible wheels comprising, in combination, a base plate, and an upright structure for contacting the side of a vehicle road wheel including a part pivotally secured to said base plate for turning movement about a vertical axis, a second part comprising a pair of spaced arms pivotally connected to said first part for turning movement about a common horizontal axis, a rod of a length to contact diametrically opposite points on the side of a vehicle road wheel, and means on the ends of said arms for supporting said rod in a substantially horizontal position, said rod adapted to be swung toward and away from the side of a vehicle road wheel by the pivotal movement of said arms about said horizontal axis.

4. A device for measuring the turning angles of vehicle dirigible wheels comprising, in combination, a base plate, a member pivotally secured to said base plate for movement about a vertical axis, means for indicating the amount of turning of said member relative to said base plate, a U-shaped structure having the arms thereof pivotally secured to said member about a horizontal axis and arranged for swinging movement about said horizontal axis toward and away from the side of a wheel being tested, the closed end of said U-shaped structure being shaped to receive a rod, and a rod carried by the closed end of said U-shaped structure and being of a length to contact diametrically opposite points on the side of a tire secured to the wheel of the vehicle being tested.

5. An apparatus for measuring the turning movements of vehicle road wheels comprising, in combination, a flat portable base plate of a length substantially greater than the width of a vehicle road wheel, an upright structure pivotally secured to the upper face of said base plate adjacent one end thereof for turning movement about a vertical axis, the section of the upper face of said base plate adjacent the other end thereof being unoccupied and therefore free to receive and support a road wheel of a vehicle thereupon, means for measuring the turning movement of said structure about said vertical axis, said structure being hinged intermediate its height for swinging the upper section thereof toward and away from the side of a vehicle road wheel supported upon the unoccupied section of said base plate, and a rod carried by the upper section of said upright structure adapted to contact the side of the vehicle road wheel supported upon the unoccupied section of said base plate, the whole apparatus forming a compact portable unit which may be laid upon the floor, and over the unoccupied section of which the road wheels of vehicles may be driven for testing purposes.

GEORGE M. GRAHAM.